(12) United States Patent
Levin

(10) Patent No.: US 6,253,437 B1
(45) Date of Patent: Jul. 3, 2001

(54) HYBRID VEHICLE MOTOR ALIGNMENT

(75) Inventor: Michael Benjamin Levin, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/261,400

(22) Filed: Mar. 3, 1999

(51) Int. Cl.$^7$ ...................................................... B23B 5/28
(52) U.S. Cl. ........................... 29/271; 29/460; 29/724; 308/194
(58) Field of Search .............................. 29/271, 260, 460, 29/464, 724, 149.5 R, 274; 308/194, 189 R

(56) References Cited

U.S. PATENT DOCUMENTS

| | | |
|---|---|---|
| 3,394,276 | 7/1968 | Cafici . |
| 4,172,310 * | 10/1979 | Mincuzzi ........................ 29/156.4 R |
| 4,212,098 * | 7/1980 | Sand ....................................... 29/460 |
| 4,295,276 * | 10/1981 | Ellington ............................. 33/181 R |
| 4,554,472 | 11/1985 | Kumatani . |
| 4,841,187 | 6/1989 | Hauke et al. . |
| 4,862,009 | 8/1989 | King . |
| 4,955,944 | 9/1990 | Aso et al. . |
| 5,001,412 | 3/1991 | Carter et al. . |
| 5,047,677 | 9/1991 | Mineta et al. . |
| 5,163,528 | 11/1992 | Kawamoto et al. . |
| 5,581,136 | 12/1996 | Li . |
| 5,713,427 | 2/1998 | Lutz et al. . |
| 5,751,084 | 5/1998 | Park . |
| 5,884,390 * | 3/1999 | Gunsallus et al. ...................... 29/598 |
| 5,893,423 * | 4/1999 | Selfors ................................. 180/65.2 |
| 5,962,941 * | 10/1999 | Serdar .................................. 310/153 |
| 6,166,498 * | 12/2000 | Yamaguchi et al. .................... 318/34 |

FOREIGN PATENT DOCUMENTS 4-168961    6/1992  (JP) .

* cited by examiner

Primary Examiner—Joseph J. Hail, III
Assistant Examiner—Daniel Shanley
(74) Attorney, Agent, or Firm—Jennifer Stec

(57) ABSTRACT

A rotor of an electric motor for a motor vehicle is aligned to an axis of rotation for a crankshaft of an internal combustion engine having an internal combustion engine and an electric motor. A locator is provided on the crankshaft, a piloting tool is located radially by the first locator to the crankshaft. A stator of the electric motor is aligned to a second locator provided on the piloting tool. The stator is secured to the engine block. The rotor is aligned to the crankshaft and secured thereto.

13 Claims, 4 Drawing Sheets

HYBRID VEHICLE MOTOR ALIGNMENT

The U.S. Government has rights in this invention pursuant to Contract No. ZCB-4-13032-02 awarded by the Department of Energy.

FIELD OF THE INVENTION

The present invention relates to hybrid electric vehicle and more particularly to an apparatus and method for aligning and supporting an electric motor from the crankshaft of the internal combustion engine of a hybrid motor vehicle.

BACKGROUND OF THE INVENTION

Hybrid electric vehicles include an internal combustion engine drivably connected to an electric motor. The electric motor is connected to the crankshaft of the motor, an example of which is shown in U.S. Pat. No. 4,862,009 ('009 patent). As shown in the '009 patent, the rotor 30 of the motor 24 is connected to the crankshaft 40 through a reduction gearset 42. The rotor is supported on both sides through a journalled connection as indicated at 35 and 70. The end of the crankshaft 40 is rotatably supported by a bearing held by the engine block 38.

While this arrangement provides support for the rotor, it is unlikely that the bearings 70 and 35 will be arranged coaxially and therefore the rotor 30 will not rotate as desired on the axis of the crankshaft 40. One reason for this is that bearing 35 is supported by the housing 26. Housing 26 is attached to the engine in a manner not shown, but typically this is achieved through a bolted and/or pinned connection to the engine block. If not done properly, at least one end of the rotor 30 will be misaligned. Furthermore, the flanges of housing 26 must be square to the axis of the crankshaft and must mate with a similarly square surface on the engine block. Due to manufacturing tolerances, it is likely that the housing 26 will not be perfectly coaxial with the crankshaft, and further misalignment of bearing 35 is likely. Finally, this arrangement requires a relatively large amount of axial package space, reducing the ability to fit this arrangement in a hybrid motor vehicle.

It would be desirable to provide a compact method for aligning a rotor to a stator in a hybrid motor vehicle providing adequate support for the rotor.

SUMMARY OF THE INVENTION

An object of the present invention is to provide a method and apparatus for aligning an electric motor in a hybrid motor vehicle to the crankshaft of the internal combustion engine of the hybrid vehicle. The alignment is provided within minimal package space and provides improved alignment of the electric motor.

Accordingly, a rotor of an electric motor is aligned to an axis of rotation for a crankshaft of an internal combustion engine having an internal combustion engine and an electric motor. A locator is provided on the crankshaft, a piloting tool is located radially by the first locator to the crankshaft. A stator of the electric motor is aligned to a second locator provided on the piloting tool. The stator is secured to the engine block. The rotor is aligned to the crankshaft and secured thereto.

An advantage of the present invention is that alignment is provided in minimal package space.

Another, more specific, advantage of the present invention is that the electric motor is supported without causing undue stress on the crankshaft.

Other objects, features and advantages of the present invention will be readily appreciated by the reader of this specification.

BRIEF DESCRIPTION OF THE DRAWINGS

The invention will now be described, by way of example, with reference to the accompanying drawings, in which.

DETAILED DESCRIPTION OF THE PREFERRED EMBODIMENTS

Figure 1:
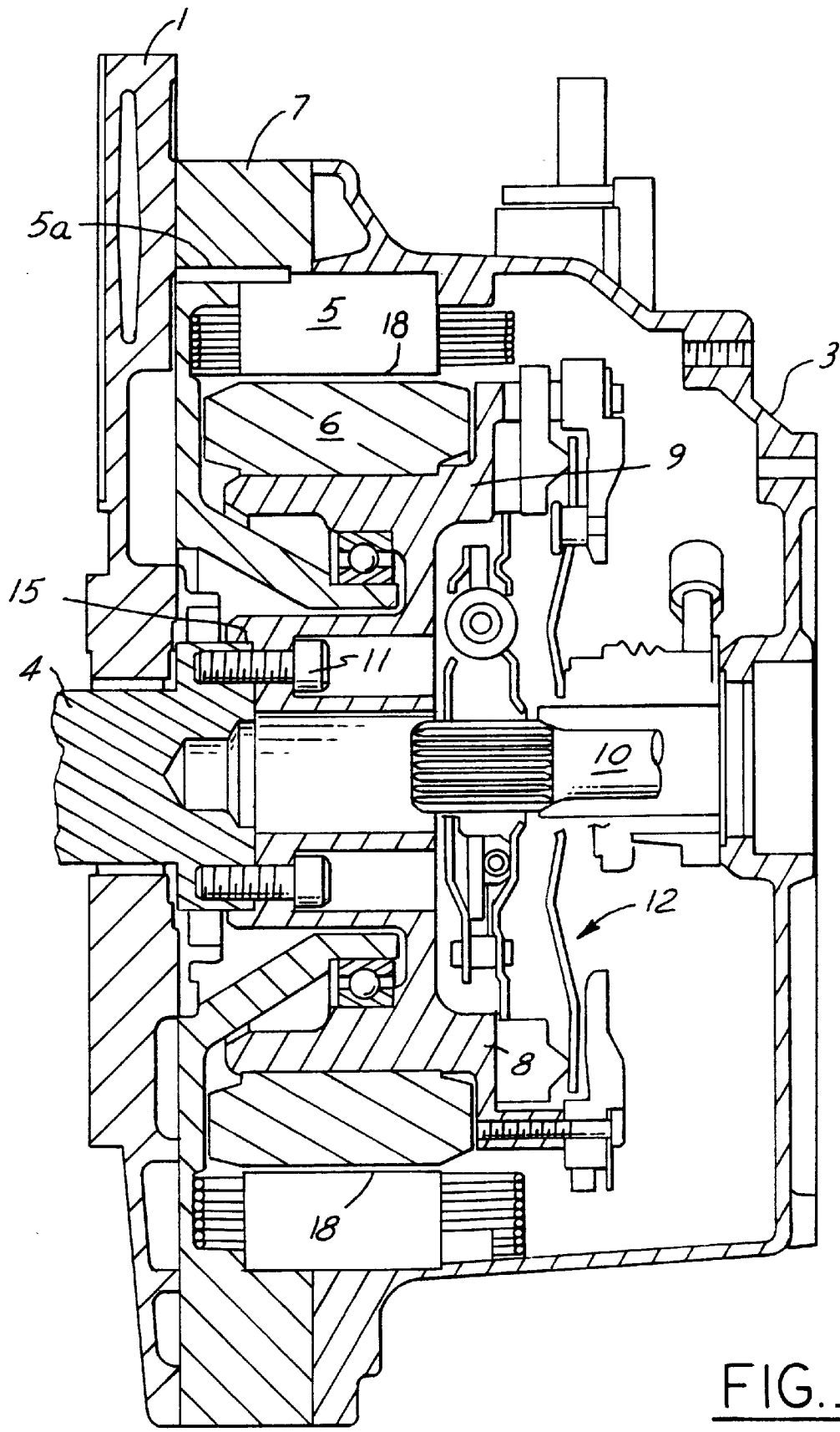
FIG. 1 is a partial cross sectional view of an aligned motor according to the present invention.

As shown in FIG. 1, a hybrid electric motor vehicle includes an internal combustion engine having an engine block 1 rotatably supporting a crankshaft 4. A rotor assembly 8 of a combined starter-alternator includes a hub 9 carrying a rotor 6 as known to one skilled in the art. The hub 9 is secured to the crankshaft 4 using a plurality of bolts 11. assembly.

Prior to installing the rotor assembly 8 to the crankshaft, a stator 5 is positioned to the engine block 1. The stator 5 includes a spacer 7 fit thereto at a pinned connection 5a. The stator 5 and spacer 7 are fixed against rotation and relative radial movement, and the pinned connection 5a provides precise radial relative location therebetween. The spacer 7 is provided in the preferred embodiment for relative positioning of the rotor assembly 8 and stator 5 with respect to the engine, but one skilled in the art appreciates the form thereof may be altered in a number of ways without departing from the intent of the present invention. The spacer 7 is not tightly secured to the block 1 and provides radial adjustment thereto.

After the stator 5 is thus loosely positioned to the block 1, the rotor assembly 8 is radially located to the crankshaft through a piloted connection 15. The piloted connection 15 includes a master locating surface formed on the outside diameter of the crankshaft 4 and a pilot diameter formed on the inside diameter of a bore in the hub 9 at the piloted connection 15. Through a line-to-line, press fit, or slight clearance fit therebetween at the pilot connection 15, the crankshaft 4 and rotor 6 are precisely located, as appreciated by one skilled in the art. A bearing 14 is fit to the rotor assembly 8. This bearing 14 may be first assembled to either one of the rotor assembly 8 or stator 5. Preferably, the bearing 14 is press fit to the rotor assembly 8 prior to assembly of the rotor assembly 8 to the stator 5. The bearing 14 preferably has a slightly sliding fit to the spacer 7 to permit axial movement relative thereto. The bearing 14 locates the spacer 7, and thus the stator 5, to the rotor assembly 8. Through this connection, a precise gap 18 is maintained between the rotor 6 and stator 5 at assembly of the motor to the engine. Preferably gap 18 is maintained as 0.35–0.45 mm. The inventors have found that variation from this specified gap affects efficiency and performance of the motor.

After the rotor assembly 8 and stator 5 are thus relatively located through the bearing 14, the spacer 7 is secured to the engine block 1. Preferably the spacer 7 is secured to the engine block 1 using a plurality of bolts 19 illustrated in FIG. 2. The spacer 7 has a clearance hole 21 provided therein at each such attachment so there is radial adjustment between the bolt 19 and the clearance hole 21 in the spacer 7, so the stator 5 may be positioned with respect to the rotor assembly 8 irrespective of relative radial position to the block 1. In an alternative embodiment (not shown) the bearing 14 is press fit to-the shaft 4 and the spacer 7 is fit to the bearing 14 prior to securing the spacer 7 to the engine block 1. This alternative embodiment does thereby locates both the rotor assembly 8 and stator 5 to the shaft 4 through the bearing 14, versus the prior embodiment where the stator 5 is located to the rotor assembly 8 through the bearing 14. In a further alternative embodiment, a second bearing (not shown) is provided between the crankshaft 4 and the spacer 7 near the engine block 1. This arrangement provides additional radial support for the starter-alternator and clutch.

Torque is transmitted through the driveline of the motor vehicle from the rotor assembly 8 through a clutch 12 in a known manner to an output shaft 10 (in a preferred embodiment a transmission input shaft). In this embodiment, a bell housing 3 is assembled over the motor. In this preferred embodiment, the rotor assembly 8 is supported for rotation by the bearing 14. The bearing 14 is supported by spacer 7 and the engine block 1. This bearing 14 support provides radial support for the weight of the rotor assembly 8 and clutch 12, and thus reduces loading on the crankshaft 4 and prevents stress breakage thereof.

Figure 2:
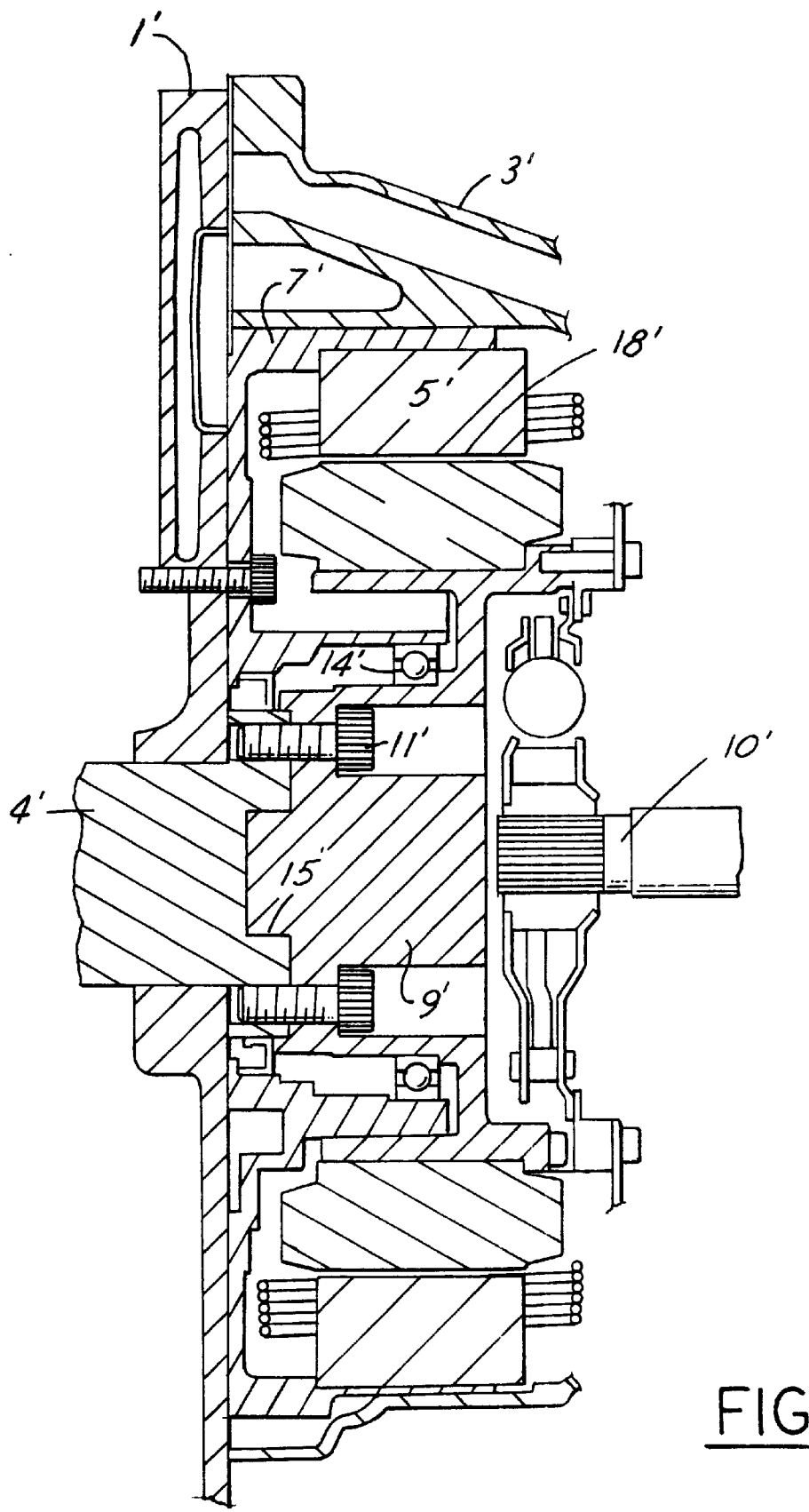
FIG. 2 is a partial cross sectional view of an alternative embodiment of an aligned motor according to the present invention.

In an alternative embodiment (not shown). the rotor is splined to the crankshaft in a manner similar to the piloted connection described above. In a further alternative embodiment, as illustrated in FIG. 2, the connection comprises an external surface on the rotor assembly 8' piloted to an internal surface on the crankshaft 4 at 15'. Similarly, one skilled in the art appreciates the rotor assembly 8 may be located to the crankshaft 4 in a number of known manners, such as pinning (not shown) the rotor assembly 8 to the crankshaft 4.

FIG. 2 illustrates as alternative embodiment of a bearing 14' support. Those members similar to the members of FIG. 1 are indicated with a prime reference number. In this embodiment, the bearing 14' is located between an outer annular surface provided on the rotor assembly 8' and an internal annular surface on the spacer 7'.

Figure 3:
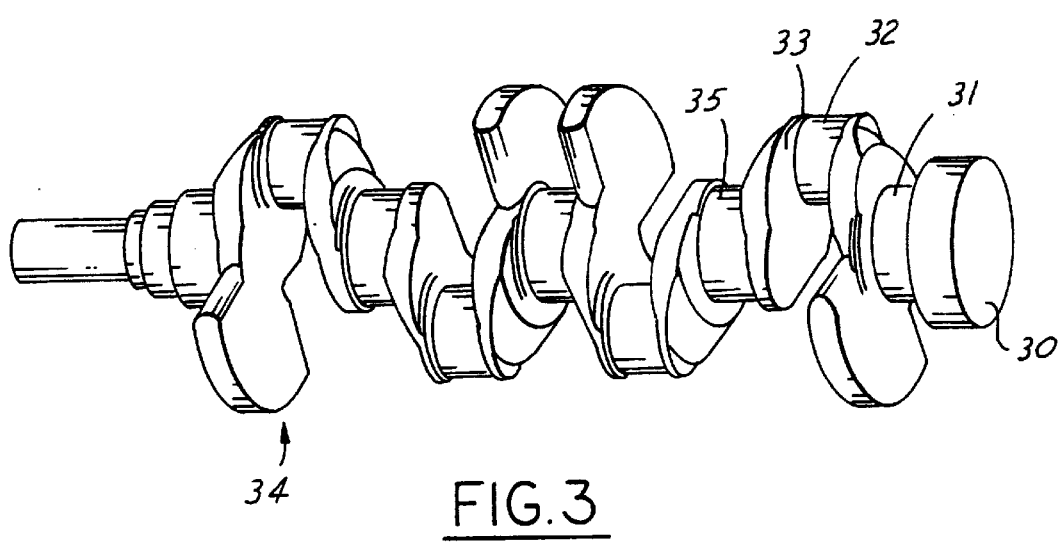
FIG. 3 is an isometric representation of a camshaft for an internal combustion engine.

FIG. 3 illustrates schematically a crankshaft 34 useful in an engine according to the present invention. The crankshaft 34 includes an end 30 for attachment to a starter-alternator as described above. Supporting the mass of the starter-alternator at this end creates a force which causes undue stress in the crankshaft 34. The crankshaft 34 is supported at the end thereof at a bearing surface 31. A connecting rod (not shown) connects near this end 30 at 32. A second bearing 35 supports the crankshaft 34 on the opposite side of the connecting rod connection 32. During operations, the cantilevered mass supported at the end 30 creates a high stress at the connecting rod connection 32 at a location 33 between the bearings 31, 35. The bearing 14' described above increases the support for this mass and reduces the stress on the crankshaft 34 at this location 33.

Figure 4:
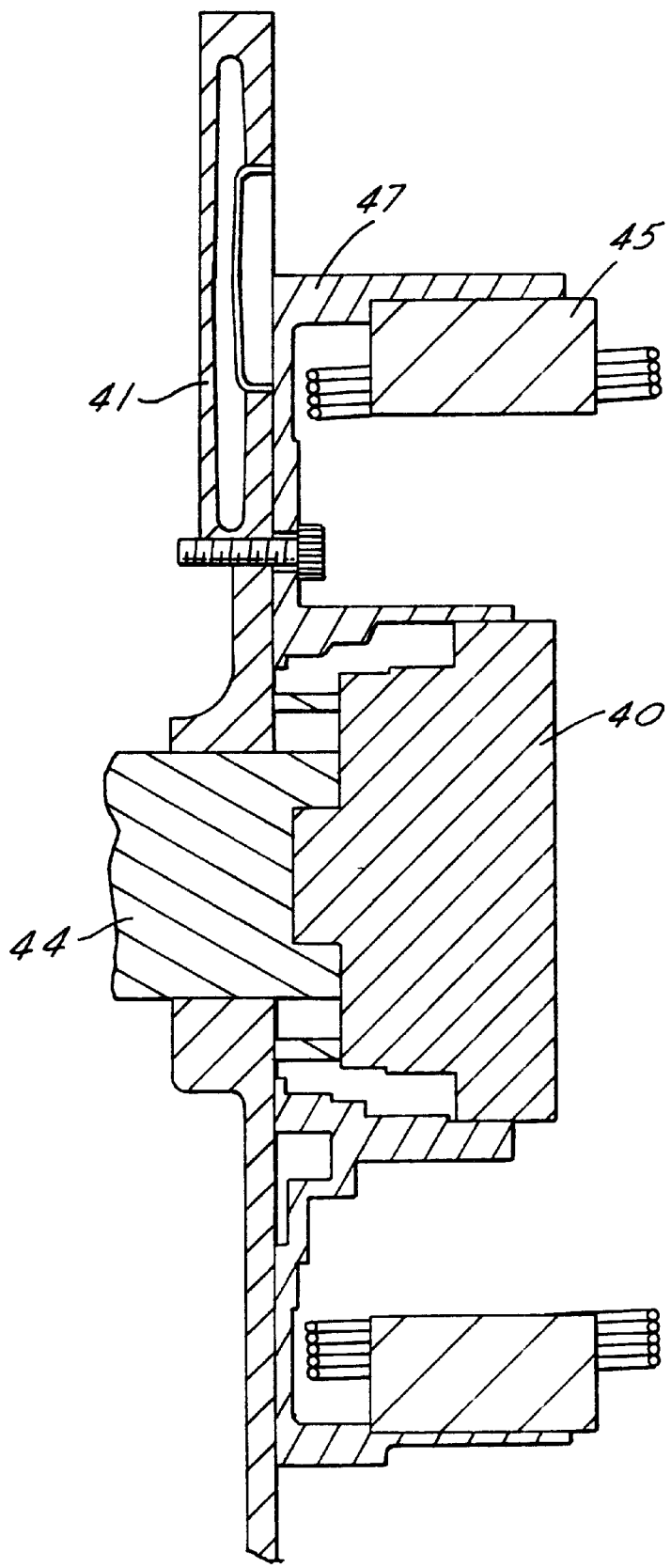
FIG. 4 is a partial cross sectional view of an alternative embodiment of an aligned motor according to the present invention.

In an alternative embodiment as illustrated in FIG. 4, members with a similar function to those described in FIGS. 1 and 2 have a similar reference number proceeded by a 4. In FIG. 4, a piloting tool 40 is located to the crankshaft 44 in a manner similar to that described with reference to the rotor assembly 8 above. After the piloting tool 40 is located to the crankshaft 44, the stator 45 is located to the tool 40. The stator is then secured to the engine block 41 through a spacer 47 in a manner as described above. The tool 40 is then removed and the rotor (not shown in FIG. 4) is secured to the crankshaft 44. The spacer 47 is located to the tool 40 at a locating interface 414 comprising surfaces on the tool 40 and spacer 47 for locating these members radially. In this embodiment, a bearing (not shown) may or may not be used to support the rotor assembly 8 and clutch 12, as described above and as dictated by the loading on the crankshaft. Similarly, other measures may be taken to reduce the stress on the crankshaft in the other embodiments described above to obviate the need for the bearing 14 described above (such as increasing the strength of the crankshaft or modifying the crankshaft support bearings).

While the best modes for carrying out the invention has been described in detail, those skilled in the art in which this invention relates will recognize various alternative designs and embodiments, including those mentioned above, in practicing the invention that has been defined by the following claims.

What is claimed is:

1. An apparatus for aligning a rotor within a stator of an electric motor of a motor vehicle having an internal combustion engine with an engine block, the rotor being aligned to a crankshaft of the internal combustion engine, the crankshaft having a first annular locating surface formed at an end thereof, the stator having a fourth annular locating surface, the apparatus comprising:

a piloting tool having a second annular locating surface for mating with the first annular locating surface of crankshaft to radially locate the piloting tool to the crankshaft, the piloting tool having a third annular surface for radially locating a stator and;

the third annular surface mating with the fourth annular surface to radially locate the stator.

2. An apparatus according to claim 1, wherein the first locator comprises a splined surface on one of an inside diameter and an outside diameter of the crankshaft, the second locator comprises a corresponding splined surface on the pilot tool.

3. An apparatus according to claim 1, wherein the first locating surface comprises a surface on an outside diameter of the crankshaft, the second locating surface comprises a pilot bore on the piloting tool.

4. An apparatus according to claim 3, wherein the third locator comprises an annular surface on the piloted connection and the fourth locator comprises a corresponding annular surface formed on the stator.

5. An apparatus according to claim 4, wherein the a bearing is interposed between the third and fourth locating surfaces.

6. An apparatus according to claim 5, wherein the electric motor comprises a starter-alternator.

7. An apparatus according to claim 6, wherein the stator is connected to the engine block through a spacer, the spacer having a plurality of attachments to the engine block, the attachments having radial slop to provide radial adjustment of the spacer to the engine block.

8. An apparatus according to claim 7, wherein the stator is radially fixed to the spacer and the bearing is press fit between the spacer and the rotor.

9. An apparatus according to claim 8, wherein the spacer has an external annular surface for supporting an inner race of the bearing and the rotor has a corresponding internal annular surface for supporting an outer race of the bearing.

10. An apparatus according to claim 9, wherein the electric motor comprises a starter-alternator.

11. An assembly for a hybrid motor vehicle comprising:

an electric motor having a hub;

an internal combustion engine having an engine block and a crankshaft having a first annular surface formed on an end thereof;

the hub having a second annular surface in registration with the first annular surface for radially locating the hub to the crankshaft, the hub further comprising a third annular surface coaxial with the first annular surface;

a beating provided on the third annular surface and having a fourth annular surface formed thereupon;

a spacer having a fifth annular surface fit to the fourth annular surface; and said spacer secured to a stator for fixing the stator to the engine block, the spacer secured to the engine block after the rotor is attached to the crankshaft, and the bearing and stator are fit to the rotor, the spacer having a plurality of attachments for securing the stator to the engine, the attachments providing for radial adjustment of the spacer to the engine block prior to attaching the spacer to the engine block.

12. The apparatus according to claim 11, wherein the first annular surface is formed on an outer surface of the end of the crankshaft and the second annular surface is formed on an inner surface of a bore formed in the rotor.

13. The apparatus according to claim 12, wherein the third annular surface is formed on an annular inner surface of the rotor and the fifth annular surface is formed on an outer surface of the spacer.

* * * * *